United States Patent
Burkhardt et al.

(10) Patent No.: US 6,709,117 B2
(45) Date of Patent: Mar. 23, 2004

(54) REFLECTOR

(75) Inventors: Klaus Burkhardt, Heerbrugg (CH); Ralf Nehrlich, St. Gallen (CH); Daniel Graf, Berneck (CH); Michael Sergl, Widnau (CH)

(73) Assignee: Leica Geosystems AG (CH)

( * ) Notice: Subject to any disclaimer, the term of this patent is extended or adjusted under 35 U.S.C. 154(b) by 0 days.

(21) Appl. No.: 10/246,752

(22) Filed: Sep. 19, 2002

(65) Prior Publication Data

US 2003/0112513 A1 Jun. 19, 2003

(51) Int. Cl.⁷ .................................................. G02B 5/12
(52) U.S. Cl. ......................................................... 359/515
(58) Field of Search .............................. 359/507, 509, 359/511, 512, 513, 514, 515, 517, 527, 553; 33/293, 700, 703, 705

(56) References Cited

U.S. PATENT DOCUMENTS

| | | | | |
|---|---|---|---|---|
| 4,519,674 A | * | 5/1985 | Buckley et al. ............. | 359/514 |
| 4,875,291 A | * | 10/1989 | Panique et al. ............... | 33/293 |
| 5,231,539 A | * | 7/1993 | McMillen ................... | 359/529 |
| 5,392,521 A | * | 2/1995 | Allen .......................... | 33/293 |
| 5,576,211 A | * | 11/1996 | Falkenberg et al. ...... | 435/297.1 |
| 5,893,214 A | * | 4/1999 | Meier et al. .................. | 33/293 |
| 6,324,024 B1 | * | 11/2001 | Shirai et al. ................ | 359/884 |

* cited by examiner

Primary Examiner—Euncha Cherry
(74) Attorney, Agent, or Firm—Rothwell, Figg, Ernst & Manbeck, PC

(57) ABSTRACT

An optical reflector, in particular for construction or geodetic surveying, has a reflective body (1) and a receptacle housing (3) for holding the reflective body (1). The reflective body (1) including transparent material has a transmission surface (5) and at least one unmetallized reflection surface (2). The receptacle housing (3) and the reflective body (1) held therein form a cavity. This is sealed water-tight from the environment of the reflector, for protecting the reflection surface (2). A structure for exchanging gas (4) is provided in the receptacle housing (3). A further development of the invention envisages detachable mounting of a component (17) on the reflector.

13 Claims, 2 Drawing Sheets

REFLECTOR

BACKGROUND OF THE INVENTION

1. Field of the Invention

The invention relates to optical reflectors, in particular for construction or geodetic surveying, according to the preamble of claim 1.

2. Description of the Related Art

Such reflectors have been used for decades in surveying as target objects for distance-measuring apparatuses or position-determining apparatuses with automatic target acquisition. The electromagnetic waves emitted by these apparatuses, for example laser beams in infrared or visible wavelength ranges are reflected back to the respective apparatus by the reflectors. For trouble-free and reliable measurement, it is necessary for many applications that such a reflector reflects the beams in a specific direction and with high intensity.

Directed reflections having such a required intensity can be achieved, for example, by means of reflective bodies which have three plane reflection surfaces oriented perpendicular to one another and a plane transmission surface for the beams which is tilted relative to each reflection surface. Reflective bodies formed in this manner are called triple prisms, reflector prisms, cube-corner reflectors or retroreflectors.

The reflection of the beams at the reflection surfaces should take place by total reflection at interfaces between the reflective bodies and the gas surrounding the reflection surfaces. If, on the other hand, interfaces are wet with liquids or droplets of condensed water vapor are deposited on them, as a rule total reflection no longer occurs at the interfaces or only in parts or with reduced intensity. This leads, inter alia, to a reduction in the distance over which distance-measuring apparatuses are used or in the achievable positional accuracy of position-determining apparatuses.

Since reflectors for surveying purposes are set up in the open air, in some cases also over relatively long periods, they are exposed to weather influences, such as, for example, rain, mist and sunlight. In order reliably to prevent wetting or misting of the respective reflection surfaces, the reflection surfaces of conventional reflectors are either surrounded by an inert gas atmosphere, for example of pure nitrogen, or provided with a reflection-promoting coating.

On the one hand, such a reflection-promoting coating of a reflection surface, for example a copper, aluminum, silver or gold layer applied by vapor deposition in a vacuum, can increase the production costs of such a reflective body by a half. On the other hand, a gas-tight housing which prevents the diffusion of water vapor is required for permanently maintaining the inert gas atmosphere around a reflection surface.

In addition, the inert gas must not be lost even in the case of a pressure increase inside the receptacle housing, which inevitably occurs during any warming up by sunlight or during transport in a transport aircraft. However, the provision of a gas-tight and pressure-resistant receptacle housing in turn requires a considerable manufacturing effort. The use of economical plastics materials is not suitable in practice for the production of gas-tight receptacle housings since these generally do not completely prevent the diffusion of water vapor.

It is therefore the object of the invention to eliminate deficiencies of the prior art. Moreover, it is intended to propose an economical reflector which reliably reflects beams in a directed manner and can be set up for a relatively long time in the open air.

This object is achieved by a reflector in which the defining features of the independent claim 1 are realized.

When a reflector for beams is mentioned in the context of the invention, it is intended to be understood as meaning reflectors having a reflective body of transparent material, for example of glass or plastic, which has at least one reflection surface and one transmission surface for the beams. These surfaces may be plane, spherical, aspherical or even in principle arbitrary, for example in the form of a freely shaped surface, depending on the application.

In the case of a reflector according to the invention, the reflection takes place as—is known—at least one reflection surface by total reflection. However, a complicated and expensive reflection-promoting coating of the reflection surfaces is not necessary. The reflective body is held in a receptacle housing which protects the at least one reflection surface from weather influences which might otherwise impair the reflective power of the reflection surface. For this purpose, the cavity bounded by the reflection surfaces and the receptacle housing is sealed substantially water-tight from the environment of the reflector. According to the invention, this receptacle housing has a means for exchanging gas which is known per se and permits automatic exchange of gas in the cavity with gas in the environment. Such an automatic exchange of gas takes place, for example, owing to different absolute or partial gas pressures inside and outside the cavity, which are caused, inter alia, by changes in the air pressure, in the atmospheric humidity or in the outside or inside temperature.

Such a means for exchanging gas may be, for example, in the form of a semipermeable membrane which on the one hand is impermeable to water and, on the other hand, permeable to gas. Such semipermeable membranes known per se are already used in electronic apparatuses which are also designed for use in the open air and whose electronic components must be reliably protected from water. For example, microporous disks of rolled PTFE are used as means for exchanging gas.

The provision, according to the invention, of a means for exchanging gas results in an automatic, controlled gas exchange and, associated therewith, also a compensation of the relative humidity between the cavity of the reflector and its environment. After a time span which is negligible in practical use, the atmospheric humidity in the cavity then corresponds to the atmospheric humidity of the environment.

By mounting a means for exchanging gas, the formation of a deposit on the reflection surfaces can be prevented even in the case of a rapid drop in the outside temperature. Reflectors according to the invention can be reliably sighted with electro-optical distance-measuring apparatuses or position-determining apparatuses with automatic target acquisition.

As a result of a means for exchanging gas being mounted according to the invention, the requirements with respect to the material and the design of a receptacle housing for an uncoated reflector are much less restricted. Thus, for example, water vapor diffusion can be permitted to a certain extent. The use of economical plastics which can be efficiently processed is possible for the production of such receptacle housings.

Moreover, the means for exchanging gas ensures that virtually the same gas pressure prevails inside and outside a reflector according to the invention. Even a drastic pressure drop, as may occur, for example, after take off of a transport aircraft in the loading bay of the latter, cannot cause a reflector according to the invention to burst since the excess pressure can automatically escape via the means for exchanging gas. Accordingly, the receptacle housing can be made thin-walled.

According to the invention, it is furthermore proposed to provide a reflector with a fastening means which, in contrast to the prior art, has an internal thread instead of an external thread. On the one hand, an internal thread is better protected from damage from mechanical impact than an external thread and, on the other hand, the internal thread coordinated with the reflector provides a flexible fastening interface for a large number of reflector applications, for example in mining, tunnel construction and earthworks or in the monitoring of objects, since fastening to standardized threaded bolts, threaded pins, through-anchors provided with corresponding threads or other "direct fixing systems" is easily possible.

A reliable reflection of the beams by the reflective body with high intensity primarily requires reliable reflection of the beams at the at least one reflection surface. However, transmission of the beams in as undisturbed a manner as possible through the transmission surface of the reflective body is also necessary. By partial wetting of the transmission surface with raindrops or snowflakes, the beams may additionally be refracted in a manner dependent on position. Consequently, the intensity of the reflection is reduced. Particularly in the case of reflectors set up stationary in exposed areas, wetting of the transmission surface can occur. Such wetting can be prevented by a component which is detachably mounted according to the invention on a corresponding reflector.

In the case of the formation of the component, a compromise must be made between the protection desired and the dimensions of the component. Components dimensioned too large are not only bulky but offer large surfaces for attack which can lead to undesired misadjustment of the reflectors in strong wind. Of course, detachable mounting of such components can give rise to the advantageous effect described above not only on reflectors according to the invention.

Further advantageous or alternative designs or developments of the invention are described in the features of the dependent patent claims.

The invention is explained in more detail below with reference to an embodiment shown in the two figures of the drawing, purely by way of example.

DETAILED DESCRIPTION OF THE PREFERRED EMBODIMENTS

Figure 1:
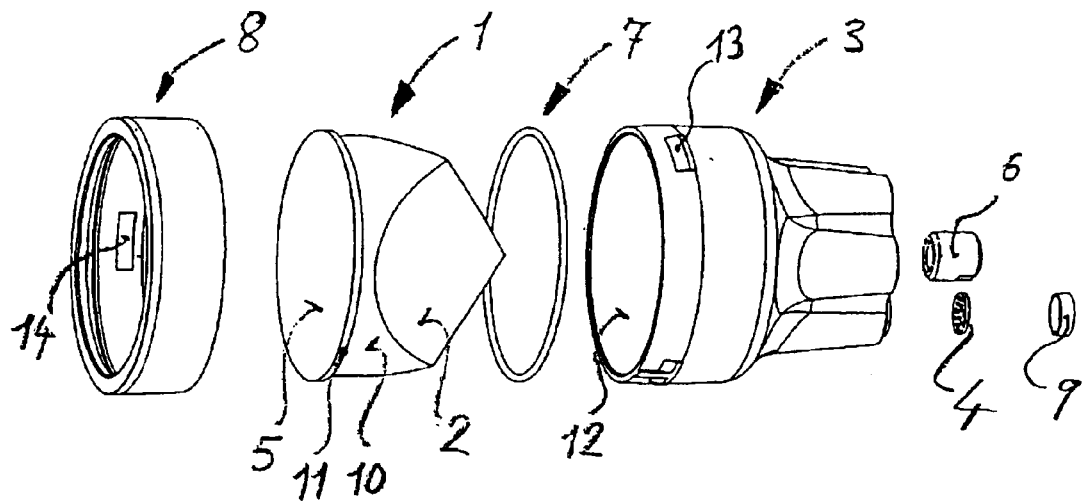
FIG. 1 shows an exploded diagram of a reflector according to the invention, in oblique view.

FIG. 1 shows an embodiment of a reflector according to the invention as an exploded diagram. This reflector consists of a reflective body in the form of a triple prism 1 and comprising transparent material, a seal in the form of an O-ring 7 and a receptacle housing 3 in the form of an injection molded plastic part and comprising a means for exchanging gas in the form of semipermeable PTFE membrane 4, a membrane cover 9, a fastening means in the form of an insert bush 6 and a retaining ring 8.

The triple prism 1 has three plane reflection surfaces 2 oriented perpendicular to one another, a plane transmission surface 5 tilted relative to each reflection surface 2, a cylindrical surface 10 oriented perpendicular to the transmission surface 5 and a collar 11 bounding the transmission surface 5. The internal diameter of the O-ring 7 corresponds to the diameter of the cylindrical surface 10.

Here, the receptacle housing 3 has on the one hand a substantially cylindrical holding region and a back wall connected to this via a connection region. The holding region has three equally spaced catch lugs 13 on its outside and a holding cylinder 12 on its inside.

The substantially cylindrical retaining ring 8 has three catch recesses 14 in an inner surface. The catch recesses 14 are arranged according to the arrangement of the catch lugs 13. The end face of the retaining ring 8 furthermore has an inward-directed projection.

Figure 2:
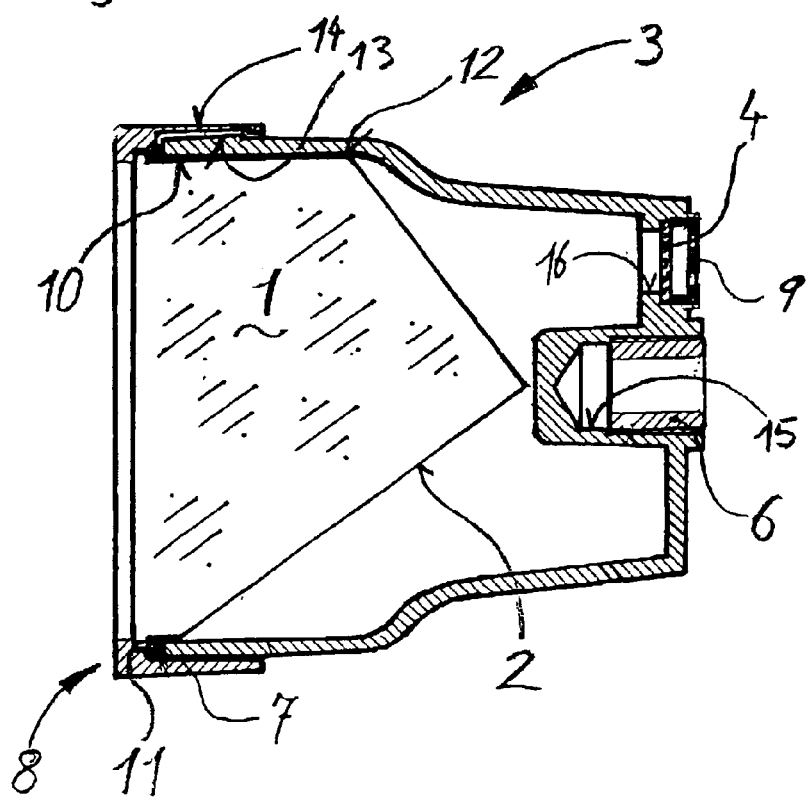
FIG. 2 shows a sectional diagram of the reflector from FIG. 1 in the mounted state, in a side view.

FIG. 2 shows a side view of the reflector from FIG. 1 in the assembled state, in section. The O-ring 7 is fitted onto the triple prism 1 and rests against the cylindrical surface 10 and the collar 11. The triple prism 1 is in turn pushed into the receptacle housing 3. The retaining ring 8 is pushed with its inside over the outside of the holding region of the receptacle housing 3. The triple prism 1 is passed, via its cylindrical surface 10, through the holding cylinder 12 of the receptacle housing 3. The three catch lugs 13 of the receptacle housing 3 are snapped into the catch recesses 14 (only one in each case is visible in FIG. 2) of the retaining ring 8 which are coordinated with them. The triple prism 1 is kept pressed against the receptacle housing 3 by the projection of the retaining ring 8 via the O-ring 7. Consequently, the triple prism 1 is sealed water-tight with the receptacle housing 3.

Here, the back wall of the receptacle housing 3 is provided with a blind hole 15 which does not pierce the receptacle housing 3 and with an exchange orifice 16 which pierces the receptacle housing 3. This exchange orifice 16 has a retaining step on which the periphery of the PTFE membrane 4 rests. The PTFE membrane 4 is joined in a water-tight manner to the receptacle housing 3 by the membrane cover 9 pressed into the end region of the exchange orifice 16. The receptacle housing 3 provided with the PTFE membrane 4 now forms a closed cavity with the reflection surfaces 2, which cavity is sealed water-tight from the environment of the reflector. Penetration of water and associated wetting of the reflection surfaces 2 can thus be prevented.

The membrane cover 9 has holes for gas exchange. Since the semipermeable, water-impermeable PTFE membrane 4 is permeable to gas, gas exchange can take place automatically between the cavity and the environment of the reflector.

Here, an insert bush 6 which is provided with an internal and an external thread is mounted on the receptacle housing 3. By means of the external thread, the insert bush 6 can be screwed in a self-locking manner into the blind hole 15 of the back wall of the receptacle housing 3. By means of the internal thread of the insert bush 6, in this case in the form of an M8 thread, the reflector can be fastened, according to the invention, to each self-supporting part having an M8 thread.

Figure 3:
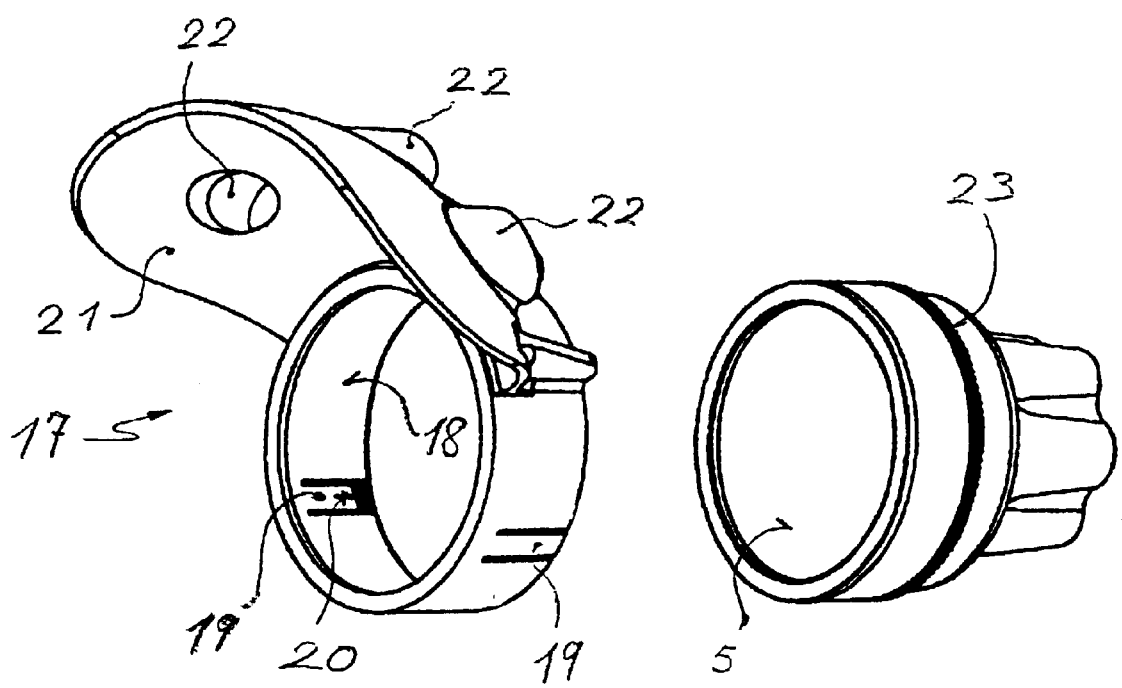
FIG. 3 shows a component which can be fastened to a reflector, in oblique view.

FIG. 3 shows an embodiment of a component 17 according to the invention and a reflector to which the component 17 can be fastened by snapping on. The reflector shown here corresponds substantially to the reflector of FIGS. 1 and 2 and has, in addition to a reflective body with a transmission surface 5, a receptacle housing on which, in contrast to the reflector of FIGS. 1 and 2, a knurled ring 23 is arranged on the outside of the holding region of the receptacle housing.

The component 17 has a fastening region for fastening to the reflector and a protective region for protecting the transmission surface 5 from wetting by rain or snow. This component 17 is optionally in the form of a one-piece injection molded part. The cylindrical fastening region has an inner, substantially cylindrical fastening surface 18 in which three retaining claws 19 are provided, only two of which are visible in FIG. 3. At the free ends, the retaining claws 19 each have an inward-directed projection. That side of the projection which faces away from the protective region is provided in each case with an insertion bevel. A retaining claw 19 is moreover provided with a protuberance 20 adjacent to the projection and extending parallel to the axis of the cylinder.

Here, the protective region has an arched canopy 21 and three wind nozzles 22 piercing the canopy 21. As a result of the wind nozzles 22, forces caused by wind can be reduced without impairing the protective effect for the transmission surface 5 of the reflector.

If the component 17 is pushed with the fastening surface 18 over the outside of the reflector, the retaining claws 19 are pushed radially outward over the insertion bevels by the knurled ring 23. Once the projection has passed the knurled ring 23, the retaining claws 19 can spring back radially inward again and grip behind the knurled ring 23 with the projection. The component 17 is now detachably fastened to the reflector.

The protuberance 20 snaps into the knurled region of the knurled ring 23 and thus prevents independent rotation of the component 17 relative to the reflector. If a predetermined torque is exerted on the component 17, the protuberance 20 is pressed radially outward by the knurled ring 23, and the component is released for rotation. It is thus possible to align the component relative to the reflector depending on local wind conditions in such a way that the transmission surface 5 is optimally protected by the component 17 from wetting by raindrops or snowflakes.

What is claimed is:

1. A reflector, in particular for construction or geodetic surveying, comprising
    a reflective body comprising transparent material, which has a transmission surface and at least one unmetallized reflection surface, and
    a receptacle housing for holding the reflective body and for protecting the at least one reflection surface,
    the cavity formed by the receptacle housing and the reflective body held therein being sealed substantially water-tight from the environment of the reflector, wherein the receptacle housing has a means for exchanging gas.

2. The reflector as claimed in claim 1, wherein the means for exchanging gas is formed by a membrane which is water-impermeable on the one hand and gas-permeable on the other hand.

3. The reflector as claimed in claim 2, wherein the means for exchanging gas is formed by a microporous membrane.

4. The reflector as claimed in claim 3, wherein the membrane consists of PTFE.

5. The reflector as claimed in claim 1, wherein the receptacle housing consists of plastic and is formed by an injection molded part.

6. The reflector as claimed in claim 1, wherein the reflective body has three plane reflection surfaces oriented perpendicular to one another and a plane transmission surface tilted relative to each of these reflection surfaces.

7. The reflector as claimed in claim 1, wherein the receptacle housing has fastening means for detachable fastening, of the reflector, which means is provided with an internal thread.

8. The reflector as claimed in claim 7, wherein the internal thread is provided on an insert bush let into the receptacle housing.

9. The reflector as claimed in claim 7, wherein the means for exchanging gas and the fastening means is arranged on that side of the receptacle housing which is opposite the transmission surface of the reflective body.

10. The reflector as claimed in claim 1, wherein an O-ring-seal, is provided between the reflective body and the receptacle housing.

11. The reflector as claimed in claim 1, wherein the reflective body is kept pressed indirectly or directly against the receptacle housing by a retaining ring which is fastenable on the receptacle housing.

12. The reflector as claimed in claim 1, wherein a component for protecting the transmission surface from wetting by rain or snow is mountable on the receptacle housing.

13. The reflector as claimed in claim 12, wherein the reflector has a knurled ring arranged on the receptacle housing and the component has a protuberance which, when the component is in the mounted state, interacts with the knurled ring.

* * * * *